April 21, 1925.
R. E. CURTIS
ATTACHMENT FOR TRACTORS
Filed Nov. 17, 1922
1,534,690
4 Sheets-Sheet 1
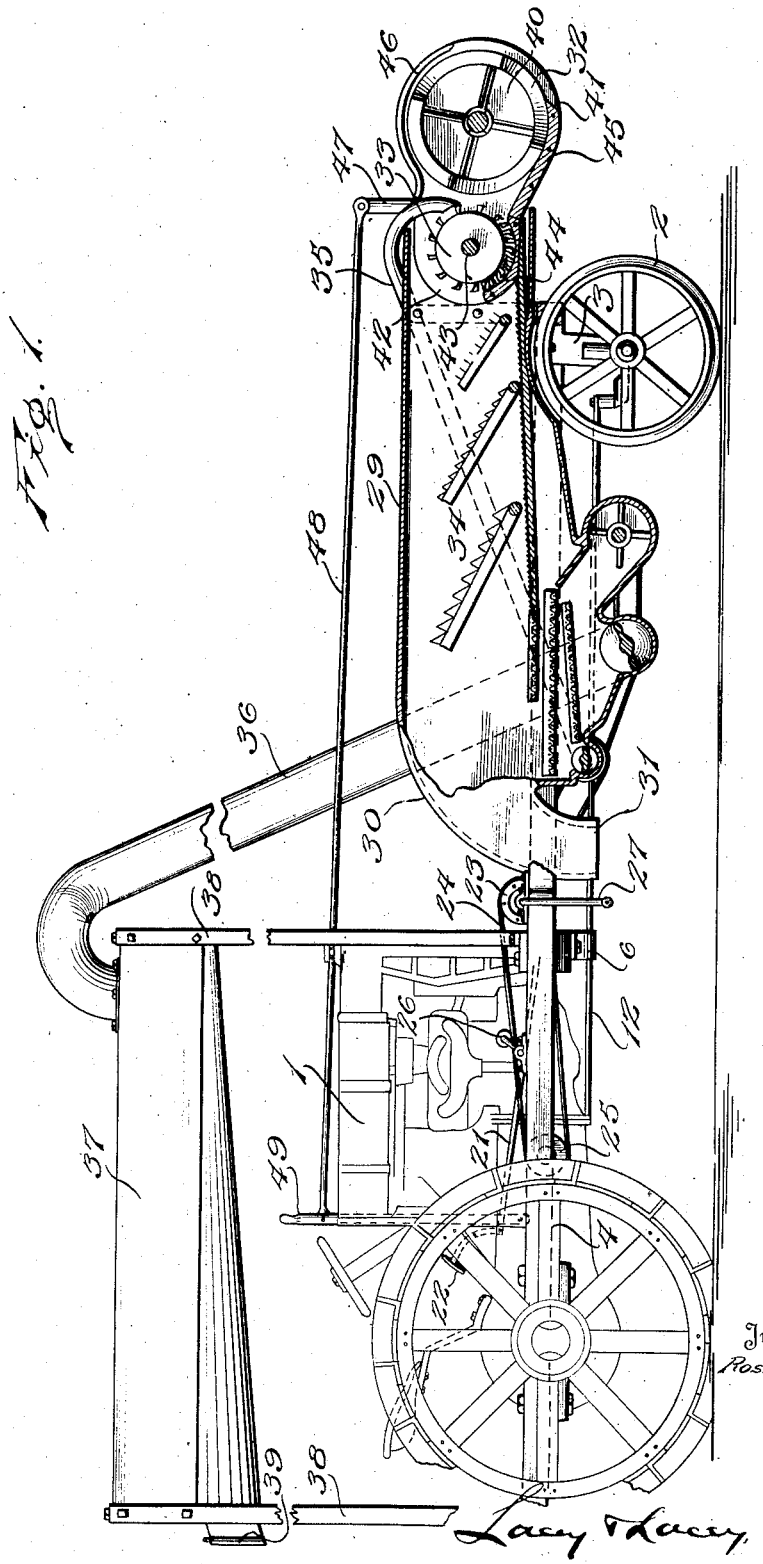
Inventor
Ross E. Curtis
Lacy & Lacy, Attorneys

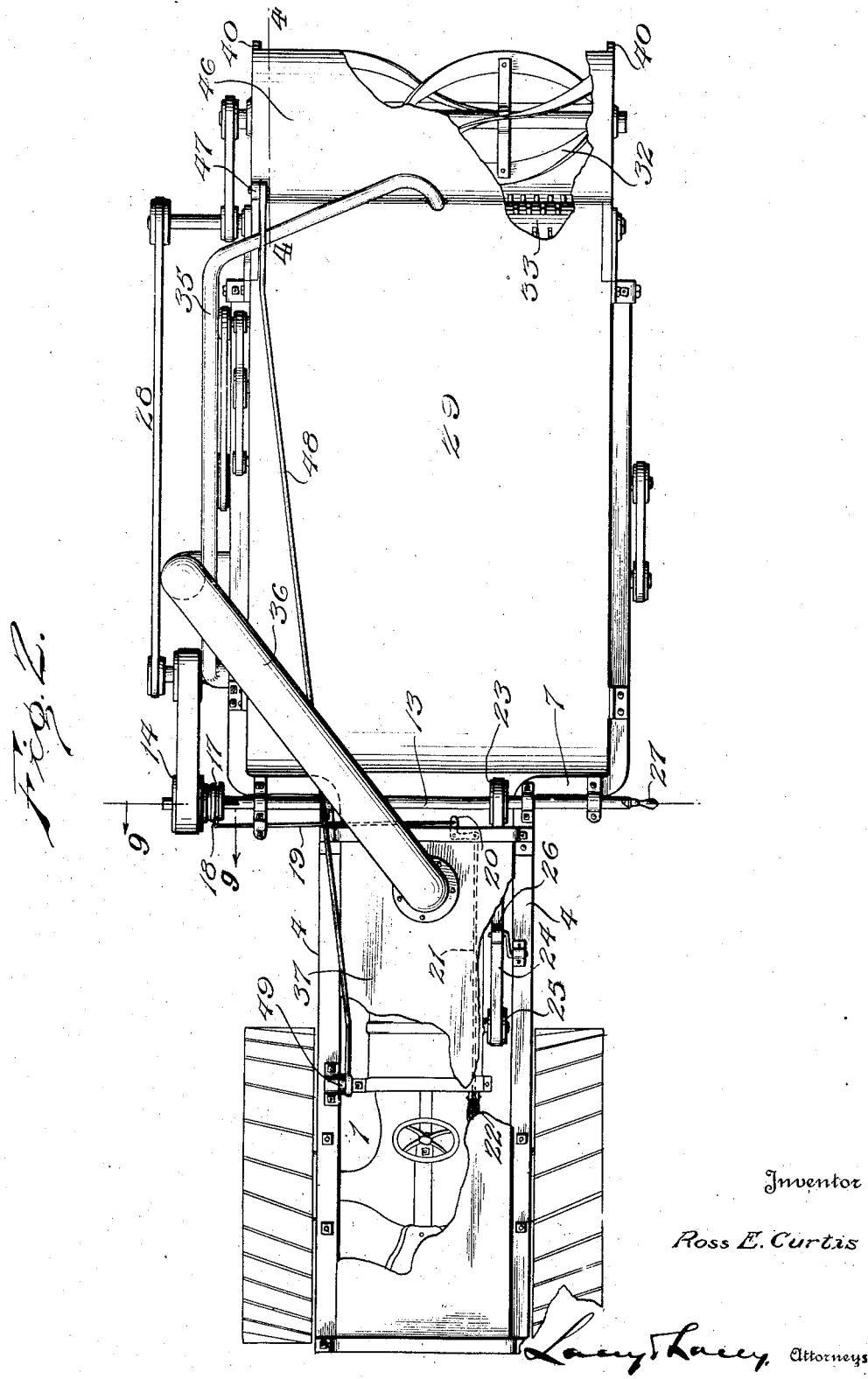

April 21, 1925.
R. E. CURTIS
1,534,690
ATTACHMENT FOR TRACTORS
Filed Nov. 17, 1922
4 Sheets-Sheet 3
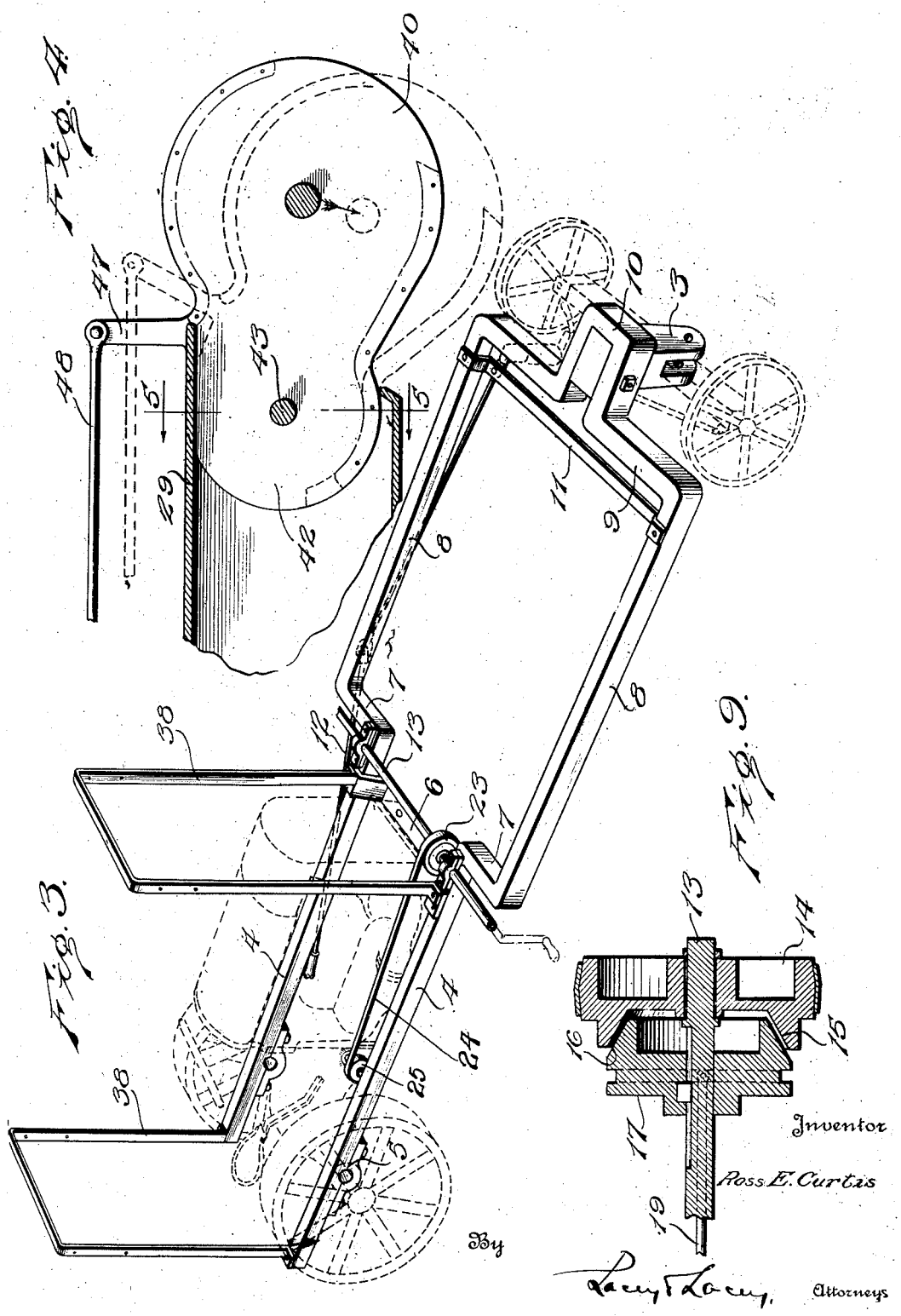
Inventor
Ross E. Curtis
By
Lacy & Lacy, Attorneys April 21, 1925.
R. E. CURTIS
1,534,690
ATTACHMENT FOR TRACTORS
Filed Nov. 17, 1922.   4 Sheets-Sheet 4
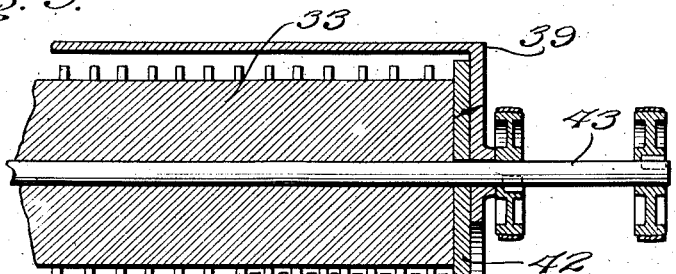
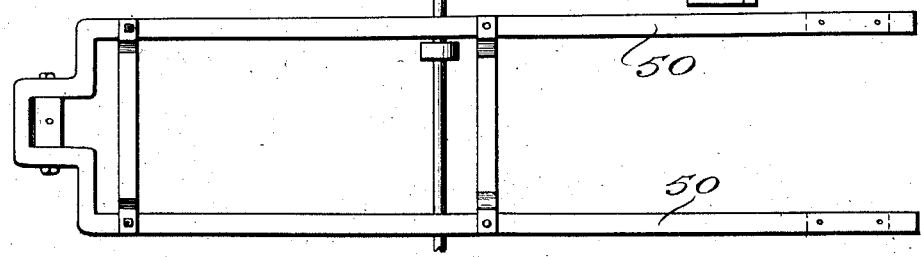
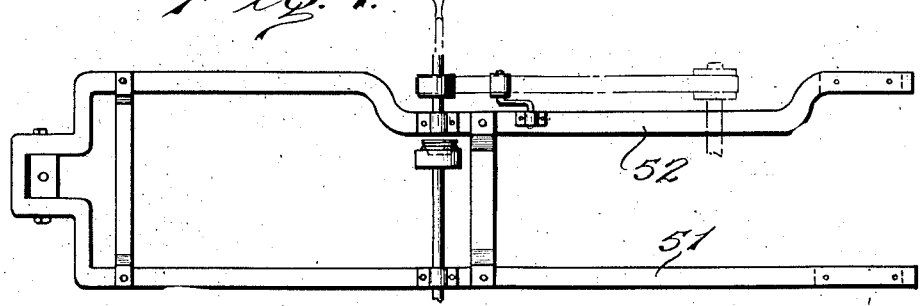
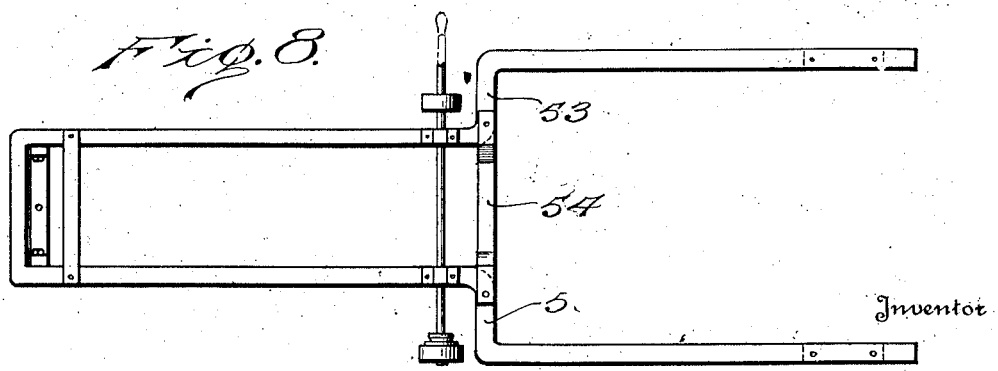
Ross E. Curtis
By Lacy & Lacy, Attorneys Patented Apr. 21, 1925.

1,534,690

UNITED STATES PATENT OFFICE.

ROSS E. CURTIS, OF LINCOLN, KANSAS.

ATTACHMENT FOR TRACTORS.

Application filed November 17, 1922. Serial No. 601,561.

*To all whom it may concern:*

Be it known that I, ROSS E. CURTIS, a citizen of the United States, residing at Lincoln, in the county of Lincoln and State of Kansas, have invented certain new and useful Improvements in Attachments for Tractors, of which the following is a specification.

This invention has for its object the provision of means whereby the wheel base of any ordinary tractor may be increased and operating mechanism supported in front of the tractor to be operated by the power of the same. Another object of the invention is to provide harvesting mechanism which may be supported in front of the tractor and operated from the power of the same as the tractor is driven over a field, and the invention seeks to provide a harvesting mechanism in which the cutter may be readily adjusted from the seat of a tractor so as to conform to the height of the grain, and also seeks to provide means whereby the harvested grain may be immediately threshed and the cleaned and threshed grain may be temporarily stored upon the tractor. The invention also seeks to provide a harvesting mechanism in which the straw and chaff will be deposited upon the ground in a thin layer to be subsequently plowed into the ground for fertilizing purposes, and a still further object is to provide a mechanism which will accomplish the desired results without cutting off the flow of air to the radiator of the tractor for cooling the same. Other incidental objects of the invention will appear in the course of the following description.

An embodiment of the invention is illustrated in the accompanying drawings, in which Figure 1 is a view, partly in side elevation and partly in longitudinal section, of a threshing mechanism applied to a tractor in accordance with the invention;

Fig. 2 is a plan view of the same partly broken away;

Fig. 3 is an enlarged detail perspective view of one form of frame;

Fig. 4 is an enlarged detail longitudinal section on the line 4—4 of Fig. 2;

Fig. 5 is a detail transverse section on the line 5—5 of Fig. 4;

Figs. 6, 7 and 8 are plan views showing different forms of extension frames, and Fig. 9 is a detail section on the line 9—9 of Fig. 2.

The tractor is indicated conventionally at 1 and may be of any well-known type. In carrying out my invention, I remove the front steering wheels 2 and the truss 3 by which said wheels are supported and employ an extension frame consisting of side bars or sills 4 which have their rear portions constructed to fit around the rear axle or the rear axle housing, as indicated at 5, and be secured thereto. In the vertical plane of the tractor radiator, I secure upon the sills or side bars 4 a transverse truss 6 which extends under the radiator and thereby supports the same and the front end of the tractor. In the form of the invention illustrated in Figs. 1, 2 and 3, the sills 4 are turned laterally, as shown at 7, just in advance of the truss 6 and are then carried forwardly in parallel lines, as shown at 8, their front ends being connected by a cross bar 9 having a central forwardly extending projection 10 to which the support 3 for the front axle is secured. The front axle with the steering wheels 2 is then brought into position under the extension 10 and secured thereto so as to support the front end of the extension frame in the same manner that it previously supported the front end of the tractor. Adjacent the front end of the extension frame is a cross bar or brace 11 to which the radius rods may be secured and the steering rod 12 is provided with an extension or elongation which is connected at its forward extremity with the steering wheel spindles in the usual manner whereby the apparatus may be steered as is now customary. Upon the side bars or sills 4 immediately in advance of the truss 6, I mount a countershaft 13 which is equipped with a pulley 14 to transmit power to the machinery which may be mounted upon the forward portion of the extension frame, and this pulley 14 may be located at one end of the countershaft or at the center of the same as may be most desirable under any given circumstances. The pulley 14 is loose upon the countershaft and is constructed with a clutch face 15 adapted to be engaged by the mating face 16 of a clutch sleeve 17 which is slidably mounted upon the countershaft but is constrained to rotate therewith. This clutch sleeve may be controlled by any convenient means, and in the present illustration is engaged by a fork 18 carried by one end of a transverse rod 19 suitably supported adjacent and parallel with the countershaft 13 and having one end connected to an angle lever 20 which is, in turn, connected with a link 21 extending to a lever 22 (either a pedal or a hand lever) upon the tractor adjacent the chauffeur's seat. The countershaft 13 is further equipped with a pulley 23 which is fixed thereto and around which is trained a belt 24 which is also trained around the power pulley 25 now commonly provided upon the side of the tractor. The pulley 25 is operatively connected with the transmission gearing of the tractor so as to be driven thereby from the tractor engine, and the belt 24 will obviously transmit the power to the countershaft so that it will rotate as the tractor is driven over the field. A belt tightener 26 of any convenient form is mounted upon the adjacent sill or side bar 4 to maintain the belt 24 in taut condition.

A crank 27 is provided to be removably fitted to the end of the countershaft 13 so that the machine may be readily started at the beginning of operations or after it has, for any reason, been temporarily stopped. It will be readily noted that, if the countershaft 13 be rotated by the use of the starting crank 27, the motion will be transmitted from the countershaft through the pulley 23 and belt 24 to the pulley 25 and from the pulley 25 will be imparted to the transmission of the engine so that the motor will be turned over and the engine started. When the machinery mounted upon the forward portion of the extension frame is to operate, the clutch member 17 is thrown into engagement with the pulley 14 so that the pulley will be locked to the countershaft and will rotate therewith and the motion of the said pulley 14 will be transmitted through a properly arranged system of pulleys and belts, indicated at 28, to the different parts to be driven.

My invention is intended more particularly for operating a harvesting machanism whereby standing grain may be cut and at one operation threshed and cleaned and delivered to a storage receptacle, and I have so illustrated it in the present application. To this end, I employ a casing or frame 29 of convenient form and dimensions which is secured rigidly upon the portions 8 of the side bars or sills and has its top plate curved downwardly at its rear end, as shown at 30, whereby a sufficient space will be provided in front of the tractor to permit air to reach the radiator in sufficient quantities to cool the same, it being noted that the countershaft 13 is disposed between this tapered or downwardly curved rear end of the casing and the radiator. The rear end of the casing is also so formed as to provide a spout 31 extending the full width of the casing which, in turn, is the full width of the cutter 32 so that the straw and chaff separated from the grain will be delivered onto the ground below the tractor and will be spread thereover in an even comparatively thin layer in order that it may be subsequently readily turned into the ground by the use of any form of plow. If conditions permit, plows may be coupled to the tractor and drawn in rear of the same so that the ground will be turned over and the straw embedded therein simultaneously with the harvesting and threshing of the grain. At the front end of the casing 29 is mounted a threshing cylinder 33 of any known or preferred construction and within the casing in rear of the threshing cylinder are mounted screens and separators of any desired arrangement, indicated conventionally at 34. This mechanism may include a tailings conveyer 35 which will return the partially threshed grain to the threshing cylinder and also includes a delivery conveyer 36 of any preferred form whereby the threshed and cleaned grain may be carried from the threshing and separating mechanism. In the present instance, this conveyer 36 is carried upwardly and rearwardly from the delivery point of the separator and deposits the grain into a receptacle or bin 37 which is supported over the tractor and serves as a cover or awning to protect the operator from the weather. This storage receptacle is carried by standards or vertical frames 38 secured rigidly upon the sills 4 at the rear ends of the same and adjacent the truss 6, and it may be equipped at its rear end or at either side with a gate or other form of outlet 39.

The cutter 32 is preferably a spiral-bladed cutter having its shaft journaled in side plates 40 and co-operating with a fixed knife or cutter 41 secured to and extending between said side plates at the lower edges of the same. The side plates extend rearwardly from the cutter so as to fit within the front end of the casing 29 immediately adjacent the side plates of the same and are in the form of lobes 42 nearly circular in outline and concentric with the shaft 43 of the threshing cylinder. The rear extensions or lobes 42 of the side plates 40 are loosely fitted upon the cylindrical shaft 43 so that it may rock thereon, and the concave 44 is secured and extends between the lower edges of the said lobes or extensions 42. Extending from the front edge of the concave 44 is a guard or guide plate 45 which is secured to and extends between the side plates 40 and abuts the fixed cutter 41, as shown most clearly in Fig. 1. A shield or cap plate 46 is secured to the upper edges of the side plates 40 and extends over the rotating cutter so that foreign matter which might otherwise tend to pass into the casing and clog the action of the cutter will be prevented from gaining access thereto. It will be readily noted that the cutter is disposed close to the concave and, consequently, when the heads of the grain are cut from the stalks, the momentum of the cutter will throw the cut heads directly onto the threshing cylinder, and this action is facilitated by the provision of the guard or guide plate 45 which prevents the head falling through the bottom of the casing or through the space between the side plates 40 carrying the cutter. To adjust the cutter, an arm 47 is secured to one side plate or to the cap 46 and to the upper end of this arm is pivoted a connecting rod 48 which extends rearwardly to a point adjacent the operator's seat where it is connected to a hand lever 49 so that it may be readily set by the operator. Rocking of the hand lever 49 will obviously be transmitted through the rod 48 to the arm 47 and a corresponding movement imparted to said arm so that the cutter support will be rocked in a vertical plane about the cylinder shaft and, therefore, set at a higher or lower point and caused to act directly upon the heads of the grain.

The form of extension frame illustrated in Figs. 1, 2 and 3 is especially adapted for the support of a threshing and harvesting mechanism inasmuch as it provides a wide support so that the cutter may make a wide swath, and the width of the swath will be sufficient to define a path over which the driving wheels of the tractor may travel without crushing the standing grain at the side of the swath. Of course, the mechanism may be arranged to cut a swath proportionately wider than that illustrated, but it will generally be found most desirable to have the width of the swath approximately equal to the width of a path over which the driving wheels of the tractor must travel. The form of the extension frame may be varied at will so that it may conform to various types of tractors, and in Fig. 6, I have shown a frame in which the side bars or sills 50 are parallel and without any lateral formations between their ends but otherwise are of the same construction as the side bars or sills previously described. In Fig. 7, I have shown an extension frame in which one side bar or sill 51 is free of any lateral formations, but the mating side bar or sill is constructed with an inset portion 52, the belt and pulleys by which the countershaft is connected with the driving pulley of the tractor being disposed at the outer side of the said inset portion. With some types of tractors, this form of extension frame may be preferred and will be found particularly advantageous. In Fig. 8, I have illustrated an extension frame in which the side bars or sills are provided with inwardly extending lateral portions 53 intermediate their ends and the truss 54 to support the front end of the tractor is secured to and extends between these inwardly projecting offsets. The form of the frame may be varied also according to the type of machinery which is to be mounted thereon and for some work some one of the illustrated forms may be found to be better adapted than the other forms, but in all the forms of the invention there is provided an extension frame which is secured about the rear axle housing or about the rear axle and projects forwardly therefrom at the sides of the tractor to increase the wheel base of the tractor and support the front end of the same, while in advance of the tractor this extension frame is adapted to carry any desired working machinery. The invention may be readily applied to tractors of any type and will be found to be advantageous in effecting an economy of time and labor in performing any given operation.

Having thus described the invention, what is claimed as new is:

1. The combination with a tractor having a side pulley, of an extension frame secured about the rear axle of the tractor and extending at the sides of and beyond the tractor, the front end of the tractor being supported on said frame, means at the front end of the frame for attaching the front axle and steering wheels of the tractor, a harvesting mechanism secured on said frame, a straw discharge spout at the rear end of the frame extending downwardly in advance of and in spaced relation to the tractor, and terminating below the frame, said spout extending the full width of the frame, and means mounted on the frame between the harvesting mechanism and the tractor for operatively connecting the harvesting mechanism with the side pulley of the tractor.

2. The combination with a tractor having a side pulley, of an extension frame connected with the rear axle of the tractor and projecting forwardly at the sides of and beyond the tractor, a harvesting mechanism mounted on said frame in advance of the tractor, means on the frame for driving the harvesting mechanism from the side pulley of the tractor, said harvesting mechanism including a threshing cylinder, side plates mounted for rocking movement upon the shaft of the threshing cylinder, a rotatable cutter fitted to and between said side plates in front of and in close relation to the threshing cylinder, means for rotating said cutter and means extending to the tractor for rocking said side plates to effect vertical adjustment of the cutter.

3. The combination with a tractor having a side pulley, of an extension frame connected with the rear axle of the tractor and supporting the front end of the tractor and projecting forwardly at the sides of and beyond the tractor, a harvesting mechanism mounted upon the forward portion of the said frame, means for driving said harvesting mechanism from the side pulley of the tractor, said harvesting mechanism including a threshing cylinder, side plates mounted upon the shaft of the threshing cylinder for vertical rocking movement, a fixed cutter secured to and extending between the lower portions of said side plates, a rotatable cutter fitted to and between said side plates in advance of the threshing cylinder to co-operate with the fixed cutter, means for rotating the rotatable cutter, and a guide plate carried by the lower portions of said side plates and extending from the fixed cutter to the threshing cylinder.

4. The combination with a tractor having a side pulley, of an extension frame secured upon the rear axle of the tractor and extending alongside the tractor, means on said frame for supporting the front end of the tractor, standards erected upon said frame at the front and at the rear of the tractor at the opposite sides thereof, a storage receptacle carried by the upper ends of said standards over the tractor, a harvesting mechanism mounted upon the extension frame in advance of the tractor, means for driving said harvesting mechanism from the side pulley of the tractor, and means for conveying grain from the harvesting mechanism into said receptacle.

In testimony whereof I affix my signature.

ROSS E. CURTIS.